United States Patent Office 3,060,319
Patented Oct. 23, 1962

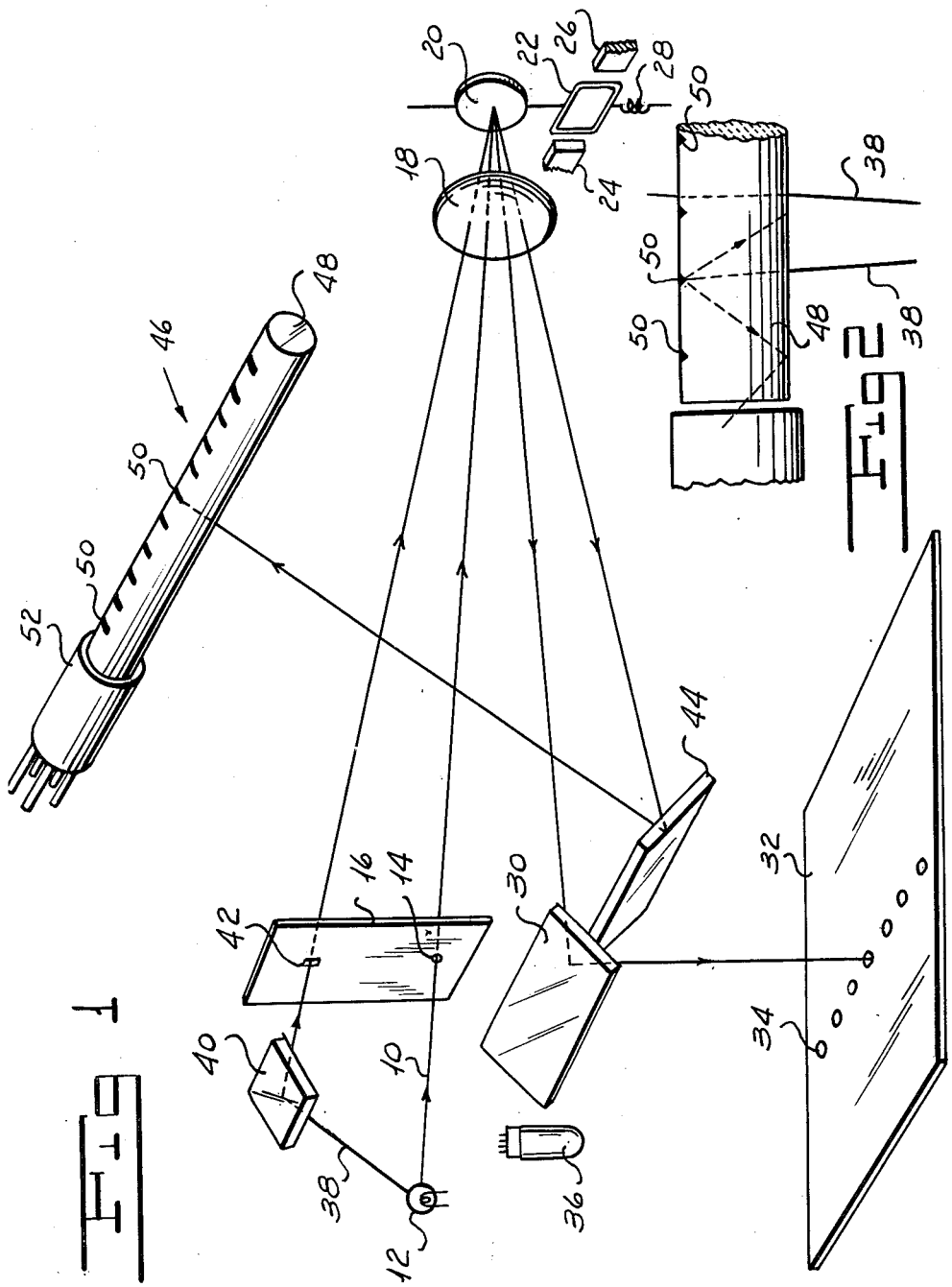

1

3,060,319
OPTICAL SYNCHRONIZER
Orville V. Greunke, Westport, Conn., assignor to United
Aircraft Corporation, East Hartford, Conn., a corporation of Delaware
Filed Dec. 8, 1960, Ser. No. 74,509
5 Claims. (Cl. 250—219)

My invention relates to an optical synchronizer and more particularly to a device for generating electrical pulses indicative of the position of a scanning beam of energy.

There are many instances in which a beam of energy is employed to scan a medium carrying information to cause a signal to be produced which represents the information. For example, in automatic systems for scoring test papers or for reading ballots or the like, a line of locations on the medium carrying the information is scanned with a beam of light to determine the location or locations at which marks have been placed on the paper. When the beam arrives at a location carrying a mark, substantially no or very little light is reflected from the paper and an indication of this fact may be produced by a suitable detector such as a photocell. In order that this information have significance, it is necessary to know not only that a mark is present but also the position of the scanning beam at the time at which the indication of the presence of a mark is produced.

An indication of beam position can be obtained by providing a plurality of photo-sensitive elements at locations corresponding to those at which marks may be placed and causing these elements to detect beam position. It will readily be appreciated that a system including a large number of photo-sensitive elements is expensive and complicated.

It is possible also that some indication of beam position can be provided by a signal generated by the means which provides the beam with its scanning motion. This system, however, inherently is relatively inaccurate since its signal will be a function of the speed and of the linearity of the scanning motion.

I have invented an optical synchronizer which generates electrical pulses indicative of the position of a scanning beam of energy. My device produces a digital representation of beam position. My optical synchronizer requires only a single photo-sensitive element for producing the required indication of beam position. The indication of beam position produced by my optical synchronizer is independent of the speed and linearity of the scanning motion of the beam.

One object of my invention is to provide an optical synchronizer for generating electrical pulses indicative of the position of a scanning beam of energy in a simple and expeditious manner.

Another object of my invention is to provide an optical synchronizer which requires only a single detector for providing the indication of beam position.

A further object of my invention is to provide an optical synchronizer for producing an indication of beam position which is independent of the speed and linearity of the scanning motion.

Other and further objects of my invention will appear from the following description.

In general my invention contemplates the provision of an optical synchronizer including a length of highly refractive transparent material carrying a plurality of energy-responsive means at spaced locations along its length. In response to a beam of energy traversing the length, the energy-responsive means causes light to be transmitted along the length of material to a detector which produces an electrical signal in response to the transmitted light.

2

In the accompanying drawings which form part of the instant specification and which are to be read in conjunction therewith and in which like reference numerals are used to indicate like parts in the various views:

FIGURE 1 is a schematic view illustrating the use of my optical synchronizer in an optical scanning system.

FIGURE 2 is a fragmentary view illustrating the mode of operation of my optical synchronizer.

Referring now to FIGURE 1 of the drawings, in one form of optical synchronizer system a beam of light, indicated by the reference character 10, emanating from a suitable light source 12 passes through an aperture 14 in a shield 16 and through a collimating lens 18 to a galvanometer mirror 20. A coil 22 mechanically connected to mirror 20 is disposed between the poles 24 and 26 of a permanent magnet assembly. The suspension of the mirror 20 includes a restoring coil 28. When a suitable electric current is passed through the coil 22, mirror 20 oscillates about an axis defined by the mirror suspension in a manner well known in the art.

After being reflected by the mirror 20, the beam 10 returns through the collimating lens 18 and strikes the reflecting surface of a mirror 30. As the mirror 20 oscillates, the beam 10 reflected from the mirror 30 scans back and forth along a line on a sheet 32 of paper. The paper 32 carries a plurality of spaced locations 34 along the line of scan of the beam 10. Marks may be placed at predetermined areas of the locations 34 in any suitable manner known to the art to indicate either the answer to a question or to indicate a choice of candidate or any other desired information. In one form of device the sheet 32 may be disposed within a housing or box (not shown) so that if the traveling beam 10 strikes a location at which no material has been deposited to make a mark, light is reflected from the paper. However, if the beam 10 strikes a location at which a mark has been made much less light is reflected. Any suitable detecting means such, for example, as a photocell 36 may be provided for indicating whether or not the location at which the beam is disposed has been marked. The system thus far described provides information which indicates whether or not a mark has been placed at the location at which the beam presently is directed. As has been pointed out hereinabove, it is necessary also to know that position which is being examined by the beam at a particular instant.

A second beam 38 of light from the source 12 is reflected by a mirror 40 through a second aperture 42 in the mask 16. Beam 38 passes through the lens 18 and to the mirror 20 from which it is reflected back through the lens to a mirror 44. Mirror 44 reflects the beam 38 and directs it toward my optical synchronizer, indicated generally by the reference character 46. Synchronizer 46 includes a rod 48 of a transparent material having a relatively high index of refraction. For example, the rod may be formed of a material such as Lucite, which is the registered trademark of E. I. du Pont de Nemours and Co. for a strong, transparent and flexible acrylic resin, Plexiglas, which is the registered trademark of Rohm and Haas Co. for a thermoplastic colorless transparent acrylic resin or any other suitable material such as glass. From the structure thus far described it will readily be appreciated that as the mirror 20 oscillates, it causes the beam 38 to move back and forth along the length of the rod 48 of my synchronizer. At spaced locations along the length of the rod 48 corresponding to the spaced locations 34 on the sheet 32, I engrave or otherwise form relatively narrow lines or grooves 50 extending in a direction perpendicular to the axis of the rod 48. The lines or grooves 50 are so located that they may intercept the beam 38 in certain positions as it moves back and forth along the length of the rod.

Referring now to FIGURE 2, it can be seen that when the beam 38 extends in a direction so as to pass between a pair of adjacent marks 50 it passes directly through the rod 48. When, however, the beam 38 extends in such a direction as to impinge on a mark 50, the light is scattered and is transmitted along the length of the rod 48 as indicated by broken lines in the figure to the ends of the rod. I mount a suitable photonsensitive device such, for example, as a photomultiplier 52 adjacent one end of the rod. In response to light transmitted along the length of the rod when the beam 38 impinges on a mark 50, the photomultiplier 52 is energized to produce an output signal. It will be appreciated that as the beam 38 travels along the length of the rod, the photomultiplier 52 puts out a series of pulses equal to the number of marks or lines 50 etched on the rod. As is explained hereinabove, the marks 50 are so spaced along the length of the rod 48 that each time the beam 10 impinges on a location 34 then at that time the photomultiplier 52 produces an output pulse. Any suitable means known to the art may be employed to count the pulses generated from the point at which one scanning sweep begins, thus to determine which location is presently being examined by the beam 10.

While I have so far described my synchronizer as being responsive to visible radiation such as will be reflected from the lines or notches 50, it is to be understood that I could as well make it responsive to a beam of electrons merely by filling the notches with a fluorescent material adapted to produce visible light in response to a beam of electrons impinging on the material. It is to be understood further that the lines or marks 50 can be regularly or irregularly spaced. They may be spaced in accordance with some mathematical function or they may be wholly irregular. The duration of the pulse resulting from the impingement of the beam 38 on a mark may be regulated by changing the width of the lines. It will readily be apparent also that one rod 48 may be provided with a number of different patterns of lines of marks and the pattern may be changed merely by rotating the cylinder or rod about its axis.

In operation of my optical synchronizer 40 in the system shown in FIGURE 1, the two beams 10 and 38 from the source 12 pass respectively through apertures 14 and 42, which may be made adjustable and then through the collimating lens 18 onto the mirror 20 and from the mirror 20 back through the lens 18. The reflected beam 10 is directed by the mirror 30 onto the surface of the paper 32 and, owing to the oscillation of the mirror 20, scans back and forth along the line of locations 34. The reflected beam 38 is directed by mirror 44 to the rod 48 and it travels back and forth along the length of the rod in the same manner as the beam 10 travels back and forth along the line of locations 34. At times corresponding to those at which the beam 10 has arrived at the various locations 34, the beam 38 strikes a mark 50 and detector 52 produces a series of pulses which may be counted to indicate the position of the beam 10. When the beam 10 strikes a location 34 which has been marked, the output of a detector such as the photocell 36 detects the presence of a mark. The count of the number of pulses which have been produced by the detector 52 indicates the position at which the mark was placed.

It will be seen that I have accomplished the objects of my invention. I have provided an optical synchronizer for generating pulses related to the position of a scanning beam of energy. My system accomplishes this result while requiring only a single photosensitive element. The accuracy of the indication is independent of the speed or linearity of the scanning motion of the beam. My synchronizer produces a digital indication of the position of a scanning beam which is extremely accurate.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A radiant energy synchronizer including in combination a source of a scanning beam of radiant energy, a length of substantially energy transparent material, means for causing said beam longitudinally to traverse said material, means disposed at spaced locations along said length of material and responsive to said beam for causing energy to be transmitted along said material and means responsive to said transmitted energy for producing a signal representing the arrival of said beam at said spaced locations.

2. An optical synchronizer including in combination a source of a scanning beam of light, a rod of substantially transparent material, a plurality of reflectors disposed in longitudinally spaced relationship along said rod, means for causing said beam to traverse said rod whereby each of said reflectors causes light to be transmitted along said rod in response to impingement of said beam thereon and means responsive to said transmitted light for producing a signal indicating the arrival of said beam at said spaced locations.

3. An optical synchronizer for producing respective impulses in synchronism with the arrival of a first scanning beam of energy at predetermined positions on a record over which said beam is moved including in combination a source of a second scanning beam of energy, a length of substantially transparent material, means for synchronizing the movement of said scanning beams over said record and along said length of material, respective means disposed at longitudinally spaced locations along said material and responsive to said second beam for causing light to be transmitted along said material and means responsive to said light for producing a signal representing the arrival of said second beam at said spaced locations.

4. An optical scanning system for scanning a plurality of locations on a record including in combination a first scanning beam of light, a second scanning beam of light, a length of substantially transparent material, a plurality of reflectors, means positioning said reflectors along said material at longitudinally spaced locations corresponding to said record locations, each of said reflectors causing light impinging thereon to be transmitted along said material, means for moving said beams in synchronism respectively over the record locations to be scanned and over the locations on said material at which said reflectors are positioned and means responsive to transmitted light for producing a series of signals representing the arrival of said scanning beam at the respective locations on said medium.

5. In an optical synchronizer for producing an indication of the arrival of a first scanning beam at a plurality of spaced locations disposed along a line on a form to be scanned, a first scanning beam of energy, a second scanning beam of energy, a length of transparent material, means disposed in spaced relationship along said length and responsive to scanning energy impinging thereon for transmitting light along said length, means for moving said beams synchronously along said line of locations and along said length of material, and means responsive to light transmitted along the length of said material for producing an electrical signal representing the arrival of said first beam at said spaced locations on said form.

References Cited in the file of this patent

UNITED STATES PATENTS

| | | |
|---|---|---|
| 1,859,020 | Brown | May 17, 1932 |
| 2,309,117 | John | Jan. 26, 1943 |
| 2,573,373 | Wales | Oct. 30, 1951 |
| 2,596,752 | Williams | May 13, 1952 |
| 2,720,810 | Senn | Oct. 18, 1955 |